Aug. 30, 1949. H. P. PELTON 2,480,304
TRAY FOR AUTOMOBILE DASHBOARDS
Filed June 19, 1946
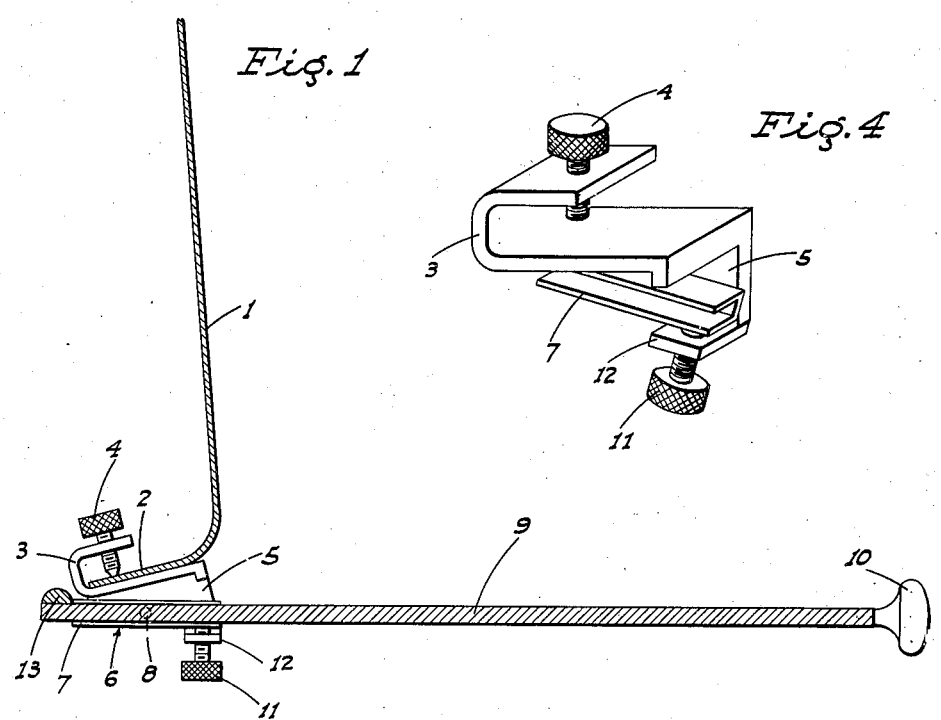
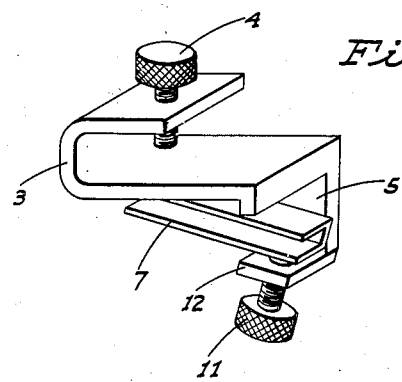
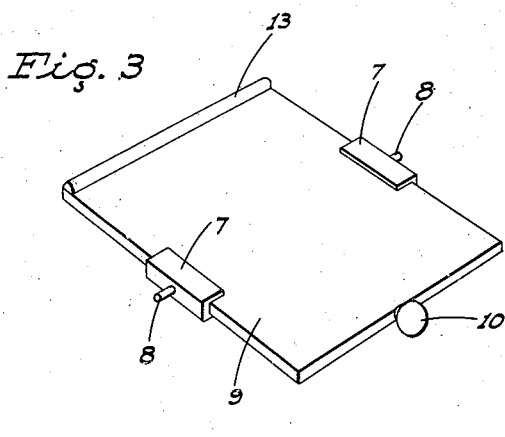
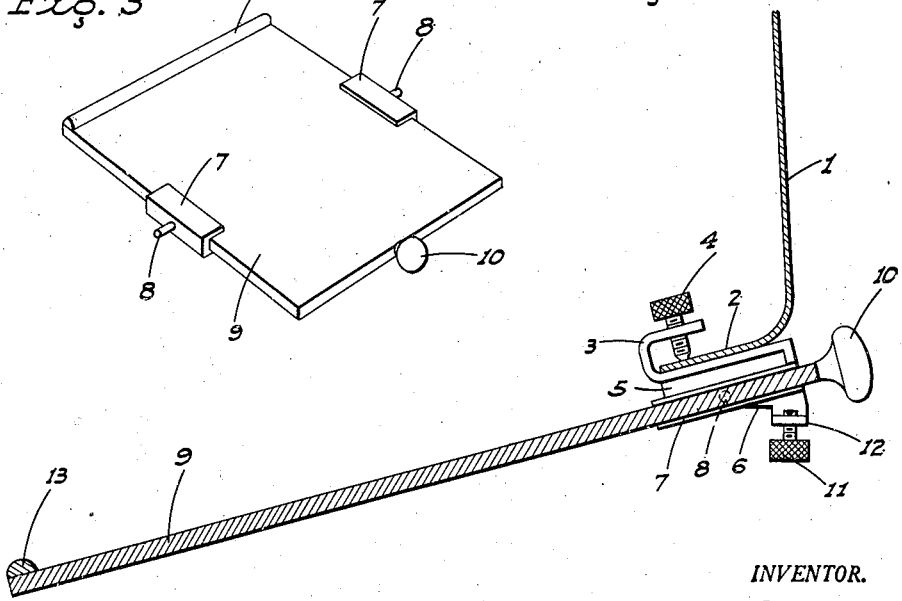
INVENTOR.
Harold P. Pelton
BY
ATTYS Patented Aug. 30, 1949

2,480,304

UNITED STATES PATENT OFFICE 2,480,304

TRAY FOR AUTOMOBILE DASHBOARDS

Harold P. Pelton, Diamond Springs, Calif.

Application June 19, 1946, Serial No. 677,713

4 Claims. (Cl. 311—21)

This invention relates to service trays, particularly one adapted for use in connection with the driver's compartment of a motor vehicle.

The primary object of the invention is to produce in combination with the front panel of the driver's compartment a tray which will be carried by such panel and be at all times available for use but which, when not in use, is concealed behind the panel.

A further object of the invention is to produce a combination in which the tray while of sufficient length for convenient use will not interfere with the wiring and instruments back of the panel but which, when projected to a point behind the panel, will automatically incline downwardly and clear the wiring and instruments.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Figure 1 is a cross sectional view of the panel showing the tray in extended position.

Figure 2 is a similar view showing the tray as it appears when projected behind the panel.

Figure 3 is a perspective view of the tray and carrying slides.

Figure 4 is a perspective view of one of the holding brackets and the slide carried thereby.

Referring now more particularly to the characters of reference on the drawings, the numeral 1 designates the panel which is in front of the driver's compartment in a motor vehicle. This panel usually has an inturned edge or flange 2 which usually inclines downwardly, and behind the panel are the several instruments, wiring, etc., as is usual in a motor vehicle. These usually are directly back of the panel and in some instances extend slightly below the same so that if an object were projected in a straight horizontal line immediately below the panel it would interfere with such instruments and wiring. For this reason it has been found impracticable to have service trays projected in that manner. The present invention, however, provides a means whereby a service tray may be projected outwardly from the panel in a true horizontal position but which when projected to a point behind the panel will automatically tilt downwardly and clear the instruments and wiring.

This latter tilting operation is provided for by a special form of holding bracket and pivoted slide mechanism. The numeral 3 designates a substantially channel shaped bracket adapted to fit over the rear edge of the flange 2 and to be secured thereto by set screws 4 in such a manner that the lower part of the bracket conforms to the slope of the flange 2. Two of these brackets 3 may be provided, or if desired the entire structure hereafter described, may be made in the form of one bracket. In any event, on the outer edge of the bracket is a down-turn flange 5, the lower edge 6 of which is disposed horizontally while the upper edge, of course, is inclined in conformity with the incline of the flange 2. Two slides 7 are provided, each slide having trunnions 8. Each trunnion 8 is pivotally mounted in one of the flanges 5 adjacent the lower edge thereof. The tray 9, provided with the operating handle 10, is slidable between the pivoted slides 7 for horizontal movement to an extended position in front of the panel 1 as shown clearly in Fig. 1. Such horizontal position may be accurately set by means of a set screw 11 projecting through a lip 12 extending outwardly from the bottom edge of one or both of the flanges 5. Forward movement of the tray is checked by means of a bumper 13 mounted on the rear edge of the tray 9.

After the tray has been used in its extended position as shown in Fig. 1 and it is desired to project it to a point back of the panel 1 it is moved rearwardly through the slides 7 which may be swung on the trunnions 8 so as to lift the front end of the tray upwardly and tilt the rear end of the same downwardly so that as the tray is projected back of the panel it inclines downwardly to a point below the instruments and wiring behind the panel 1. Since the weight of the tray is then to the rear of the axis of the trunnions 8, the tray will normally remain in set inclined position and in clearance relation to the instruments and wiring back of the panel 1. When again projected to the forward position beyond the panel 1 the tray may then again be moved to horizontal position in which it will be rigidly held by reason of its engagement with the set screws 11 and the rear end of the brackets 3.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A service tray comprising in combination with a face panel, a support adjacent the lower edge of the panel such support inclining backwardly and downwardly from such lower edge of the panel, a pair of spaced flanges projecting downwardly from the support, a pair of slides, a trunnion on each slide pivotally disposed in one of said flanges, a tray slidably disposed in said slides, and means engageable with the slides at spaced points to limit the pivotal movement of the slides in both directions.

2. The combination with a panel having a flange on its lower end which inclines downwardly and rearwardly from the bottom edge of the panel, a pair of spaced flanges secured to the first flange and extending downwardly from the same, a pair of slides, a trunnion on each slide pivotally mounted in one flange of said pair of flanges, a tray slidably disposed in said slides, a horizontally disposed stop means on the forward ends of said pair of flanges, the upper side of the slides being engageable with the inner end of the first named flange and the under side of the slides being engageable with said stop means when the tray is projected forwardly of the panel, whereby to hold the tray in substantially horizontal position.

3. A structure as in claim 2 in which the stop means comprises a horizontally projecting lip on one of the pair of flanges and a set screw vertically adjustable through said lip.

4. A tray unit for use in motor vehicles, such unit including a bracket, means for attaching the bracket to the front panel in the driver's compartment of the vehicle, a depending flange on one edge of the bracket, the bottom edge of the flange being out of parallel with the under face of the bracket, a stop member on the lower edge of the flange adjacent the end which is most widely spaced from the bracket, a slide member pivotally mounted in the flange and being engageable at one end with the under side of the bracket and at the other end with the stop member, whereby to automatically limit the swinging movement of the slide in both directions, and a tray slidably disposed in the slide.

HAROLD P. PELTON.

REFERENCES CITED

The following references are of record in the file of this patent:

UNITED STATES PATENTS

| Number | Name | Date |
|---|---|---|
| 371,408 | Becker | Oct. 11, 1887 |
| 603,252 | Briggs | May 3, 1898 |
| 1,700,325 | Bayman et al. | Mar. 7, 1933 |
| 2,161,275 | Betts | June 6, 1939 |
| 2,177,575 | Maxwell et al. | Oct. 20, 1939 |
| 2,270,557 | Randall | Jan. 20, 1942 |